(12) United States Patent
Kainulainen et al.

(10) Patent No.: US 9,494,673 B2
(45) Date of Patent: Nov. 15, 2016

(54) ADDITIONAL DATA USABLE IN APPARATUS POSITIONING

(75) Inventors: Antti Paavo Tapani Kainulainen, Espoo (FI); Joni Jorma Marius Jantunen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1303 days.

(21) Appl. No.: 13/347,174

(22) Filed: Jan. 10, 2012

(65) Prior Publication Data

US 2012/0178471 A1 Jul. 12, 2012

Related U.S. Application Data

(60) Provisional application No. 61/431,585, filed on Jan. 11, 2011.

(51) Int. Cl.
*G01S 5/00* (2006.01)
*G01S 5/08* (2006.01)
*H04W 64/00* (2009.01)

(52) U.S. Cl.
CPC ............ *G01S 5/0009* (2013.01); *G01S 5/08* (2013.01); *H04W 64/00* (2013.01)

(58) Field of Classification Search
CPC ............ G01S 5/08; G01S 5/0009; H04W 64/00; H04W 64/003
USPC ................................................ 455/456.1
See application file for complete search history.

(56) References Cited

U.S. PATENT DOCUMENTS

| | | |
|---|---|---|
| 6,380,888 B1 | 4/2002 | Kucik |
| 6,975,618 B1 | 12/2005 | Smith et al. |
| 6,987,975 B1 | 1/2006 | Irvin et al. |
| 7,181,230 B2 | 2/2007 | Nonoyama et al. |

(Continued)

FOREIGN PATENT DOCUMENTS

| | | |
|---|---|---|
| CN | 201131037 Y | 10/2008 |
| EP | 1416703 | 5/2004 |

(Continued)

OTHER PUBLICATIONS

English Language Machine Translation of Chinese Patent Publication No. CN201131037Y—5 pages.

(Continued)

*Primary Examiner* — Christopher M Brandt
(74) *Attorney, Agent, or Firm* — Locke Lord LLP

(57) ABSTRACT

A system for providing positioning information within a wireless communication signal. An apparatus may determine whether to provide information usable for positioning in a packet. If it is determined that positioning information will be provided in the packet, header information in the packet may be configured to indicate that the packet includes positioning information. The positioning information may then be included in the packet, which may then be transmitted. When the packet is an advertising packet, the packet may be transmitted on an advertising channel. A scanning apparatus may then receive the packet and may determine, based on the header information in the packet, whether the packet includes positioning information. If it is determined that the packet includes positioning information, positioning in the scanning apparatus may be configured based on the header information, and positioning may be performed in the scanning apparatus based on the positioning information in the packet.

21 Claims, 15 Drawing Sheets

(56) References Cited

U.S. PATENT DOCUMENTS

| | | | |
|---|---|---|---|
| 7,512,685 B2 | 3/2009 | Lunsford et al. | |
| 7,606,578 B2 | 10/2009 | Irvin et al. | |
| 7,986,917 B2 | 7/2011 | Ahlgren et al. | |
| 8,165,523 B2 | 4/2012 | Makela et al. | |
| 8,249,035 B2 | 8/2012 | Godavarti et al. | |
| 8,374,633 B2* | 2/2013 | Frank et al. | 455/456.4 |
| 2002/0068584 A1* | 6/2002 | Gage | H04L 29/1216 |
| | | | 455/456.1 |
| 2002/0175819 A1 | 11/2002 | Joo | |
| 2003/0013444 A1* | 1/2003 | Watanabe et al. | 455/435 |
| 2003/0220114 A1 | 11/2003 | Langensteiner et al. | |
| 2004/0142690 A1 | 7/2004 | Eom et al. | |
| 2004/0162059 A1 | 8/2004 | Hiltunen et al. | |
| 2005/0032531 A1 | 2/2005 | Gong et al. | |
| 2005/0156712 A1 | 7/2005 | Jyrinki | |
| 2005/0267677 A1 | 12/2005 | Poykko et al. | |
| 2005/0289236 A1 | 12/2005 | Hull et al. | |
| 2006/0018315 A1* | 1/2006 | Baratakke et al. | 370/389 |
| 2006/0019679 A1 | 1/2006 | Rappaport et al. | |
| 2007/0042710 A1 | 2/2007 | Mahini et al. | |
| 2007/0077941 A1 | 4/2007 | Gonia et al. | |
| 2007/0099679 A1 | 5/2007 | Saarisalo | |
| 2007/0123273 A1 | 5/2007 | Vare et al. | |
| 2007/0167171 A1 | 7/2007 | Bishop | |
| 2007/0197229 A1 | 8/2007 | Kalliola et al. | |
| 2008/0154501 A1 | 6/2008 | Meyer | |
| 2008/0311957 A1 | 12/2008 | Jantunen et al. | |
| 2008/0318593 A1* | 12/2008 | Cao | H04W 4/02 |
| | | | 455/456.1 |
| 2009/0221298 A1 | 9/2009 | Hanner | |
| 2009/0305724 A1 | 12/2009 | Lohi | |
| 2010/0020697 A1* | 1/2010 | Lewis | H04L 1/1671 |
| | | | 370/241 |
| 2010/0081376 A1 | 4/2010 | Emura | |
| 2010/0250135 A1 | 9/2010 | Li et al. | |
| 2010/0291952 A1 | 11/2010 | Gosset et al. | |
| 2010/0302102 A1* | 12/2010 | Desai et al. | 342/417 |
| 2010/0309051 A1 | 12/2010 | Moshfeghi | |
| 2010/0317289 A1 | 12/2010 | Desai et al. | |
| 2011/0111726 A1* | 5/2011 | Kholaif | G01S 1/68 |
| | | | 455/404.2 |
| 2011/0201357 A1 | 8/2011 | Garrett et al. | |
| 2011/0243267 A1* | 10/2011 | Won et al. | 375/268 |
| 2012/0052802 A1 | 3/2012 | Kasslin et al. | |
| 2012/0178471 A1 | 7/2012 | Kainulainen et al. | |
| 2012/0238288 A1 | 9/2012 | Donaldson | |

FOREIGN PATENT DOCUMENTS

| | | |
|---|---|---|
| EP | 1538791 | 6/2005 |
| EP | 2474834 | 7/2012 |
| WO | WO9810307 | 3/1998 |
| WO | WO0201814 | 1/2002 |

OTHER PUBLICATIONS

Partial European Search Report mailed May 4, 2012 for European Application No. 11195136.4, 5 pages.

Bluetooth Specification Version 4.0, vols. 0-6, Jun. 30, 2010, pp. 1-2302.

GPS Navstar: "Global Positioning System Standard Positioning Service Signal Specification", 2nd Edition, Jun. 2, 1995, 52 pages.

Extended European Search Report and Opinion for European Application No. EP 11195869—Date of Completion of Search: Jan. 30, 2013, 10 pages.

Extended European Search Report for EP App. No. 12160097.7—Date of Completion of Search: Jul. 23, 2013, 9 pages.

* cited by examiner

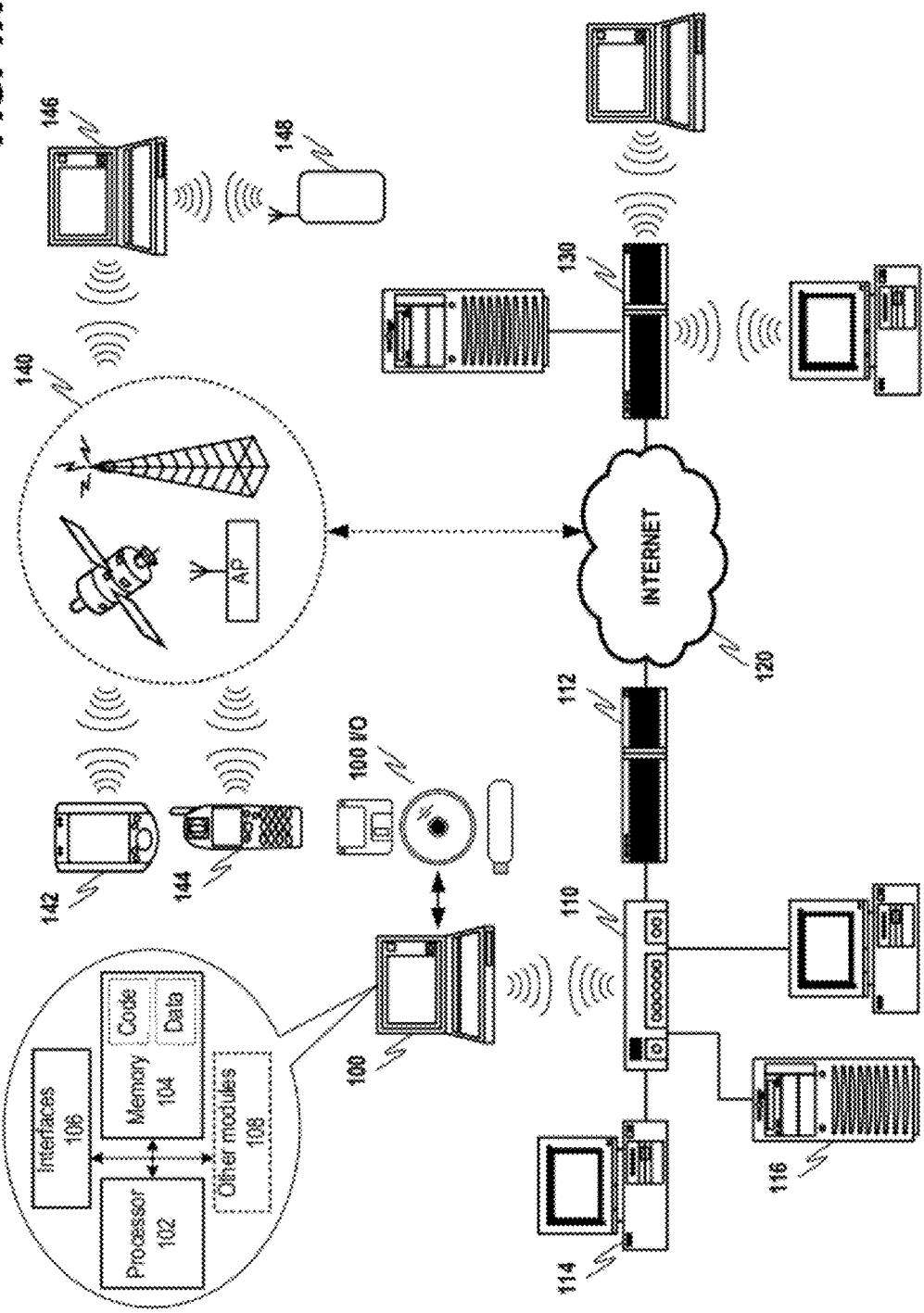

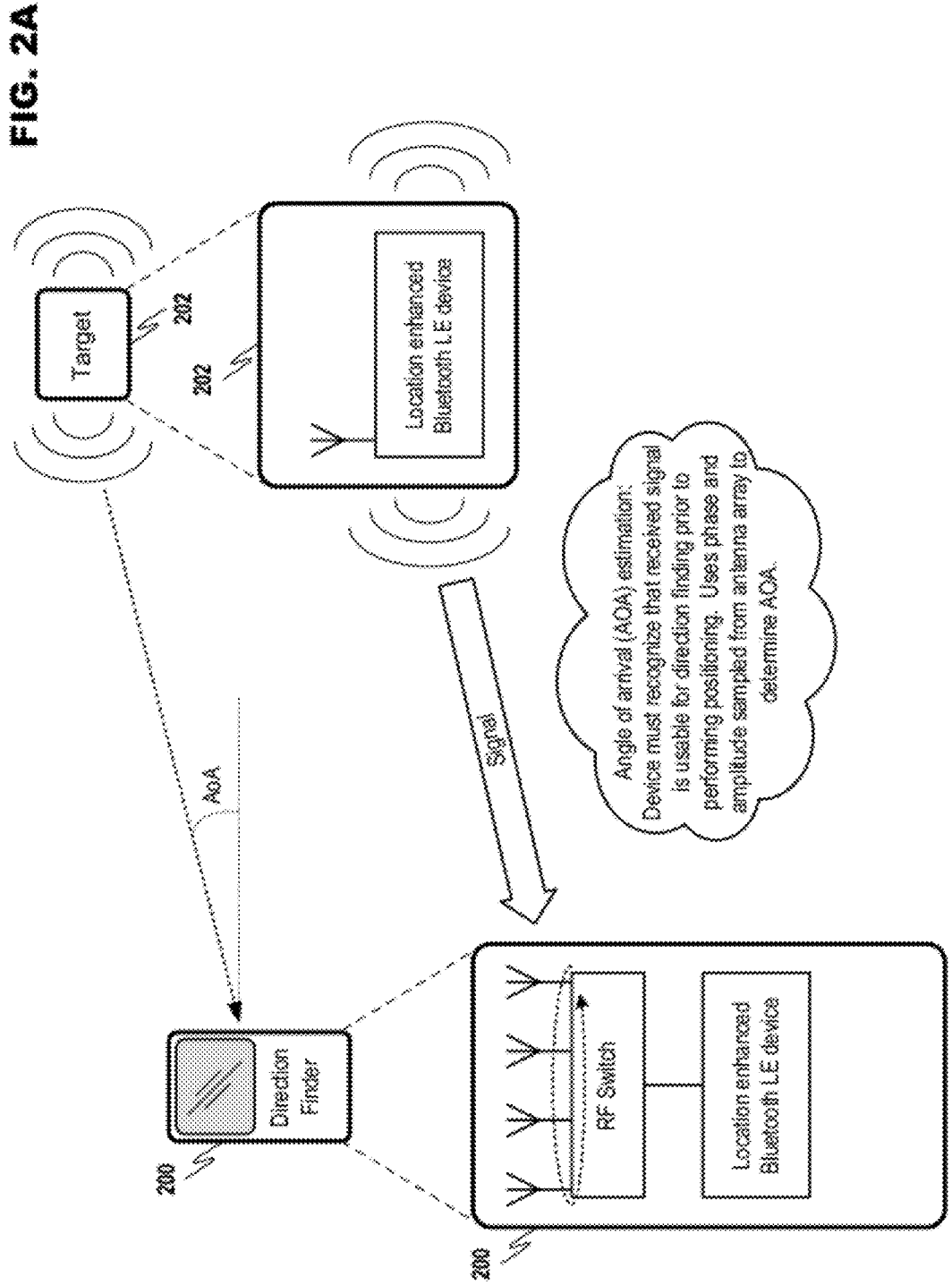

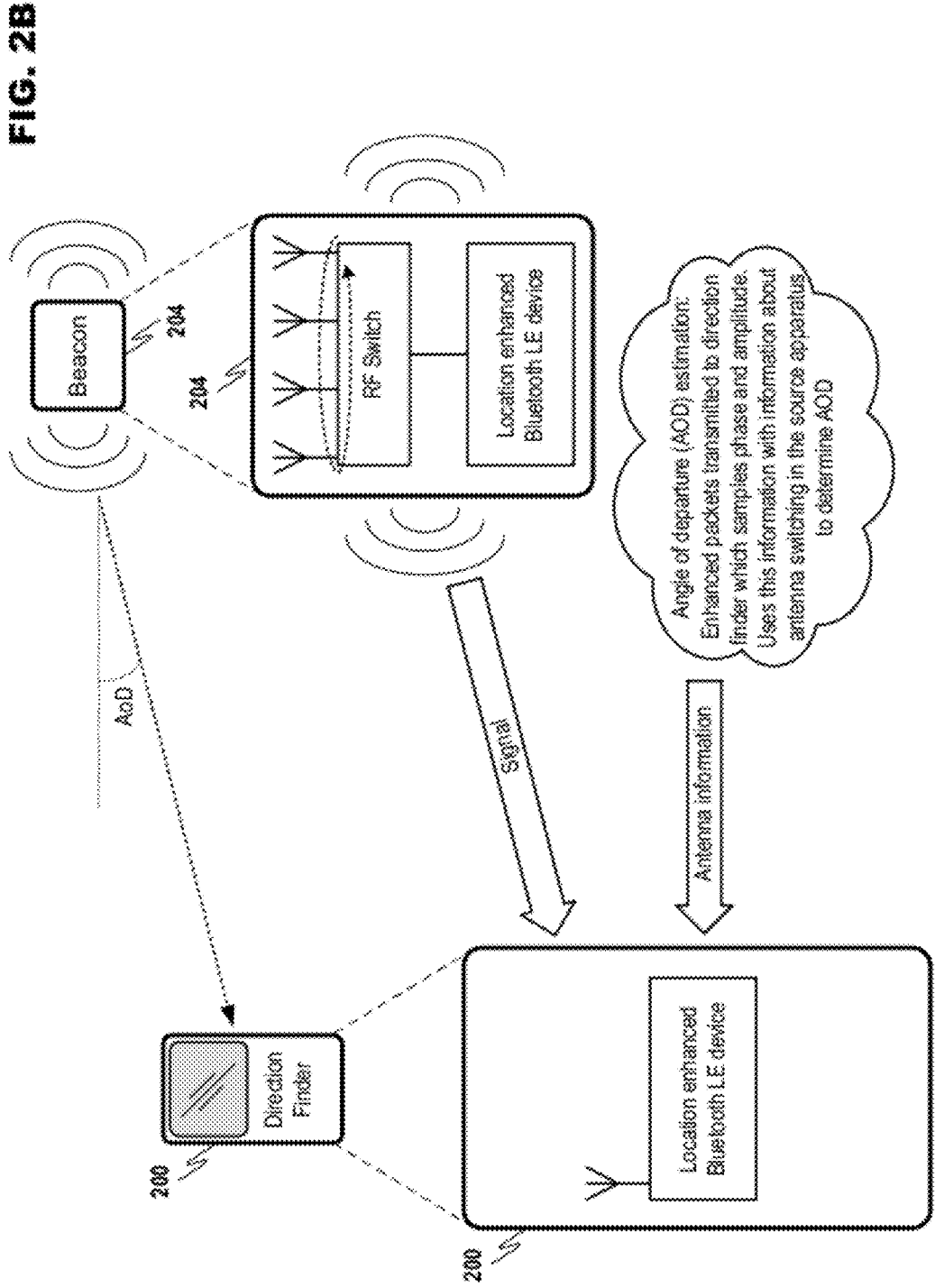

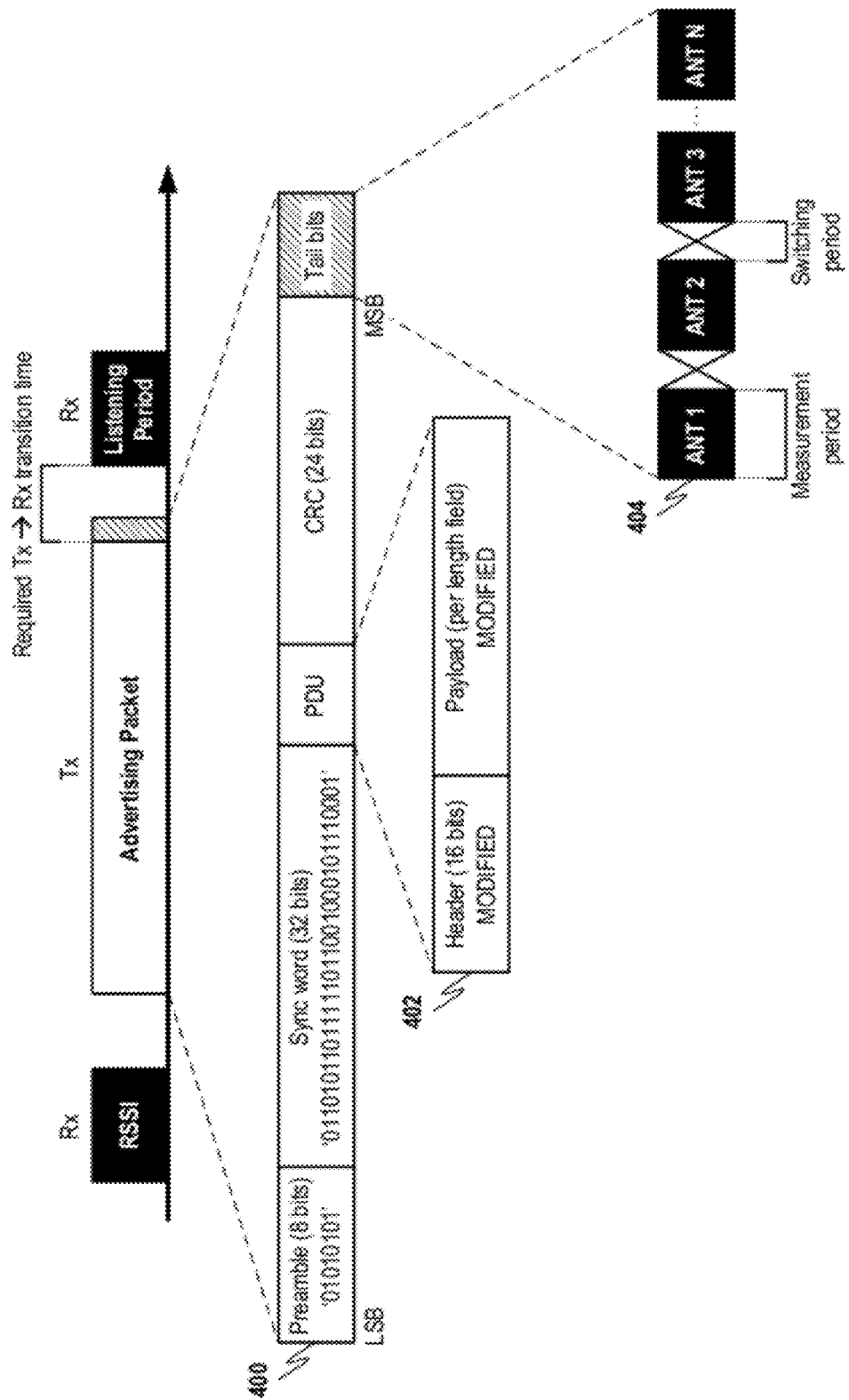

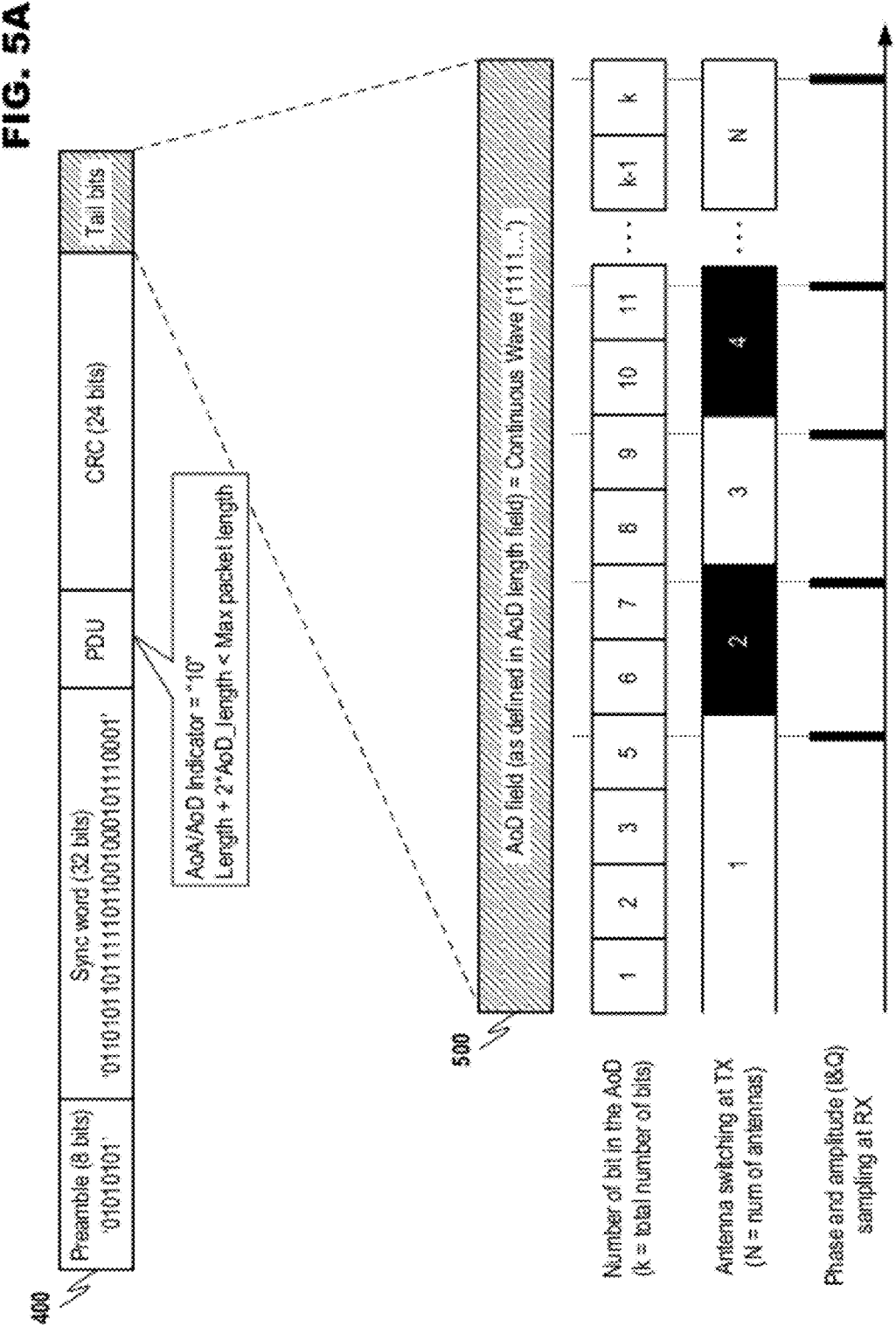

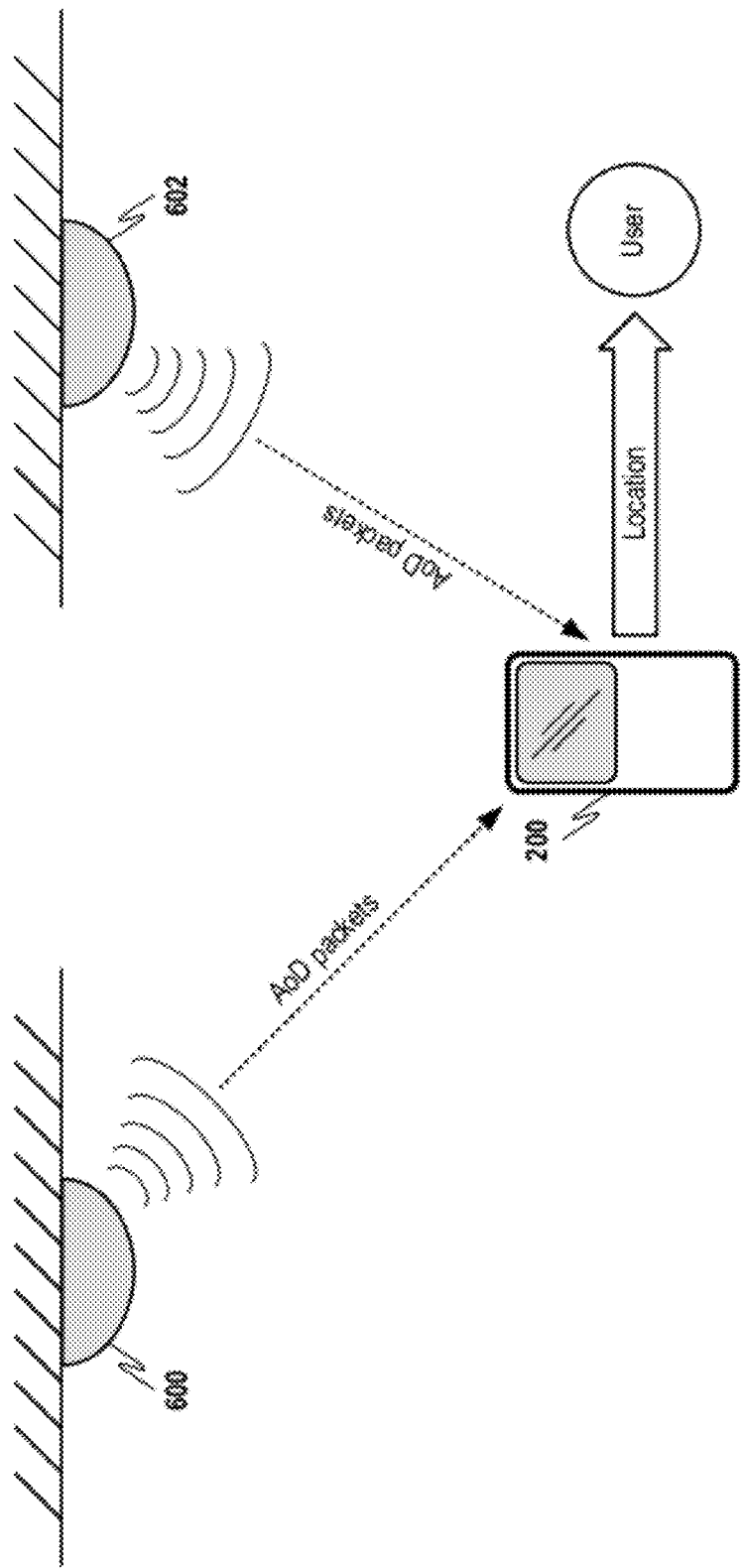

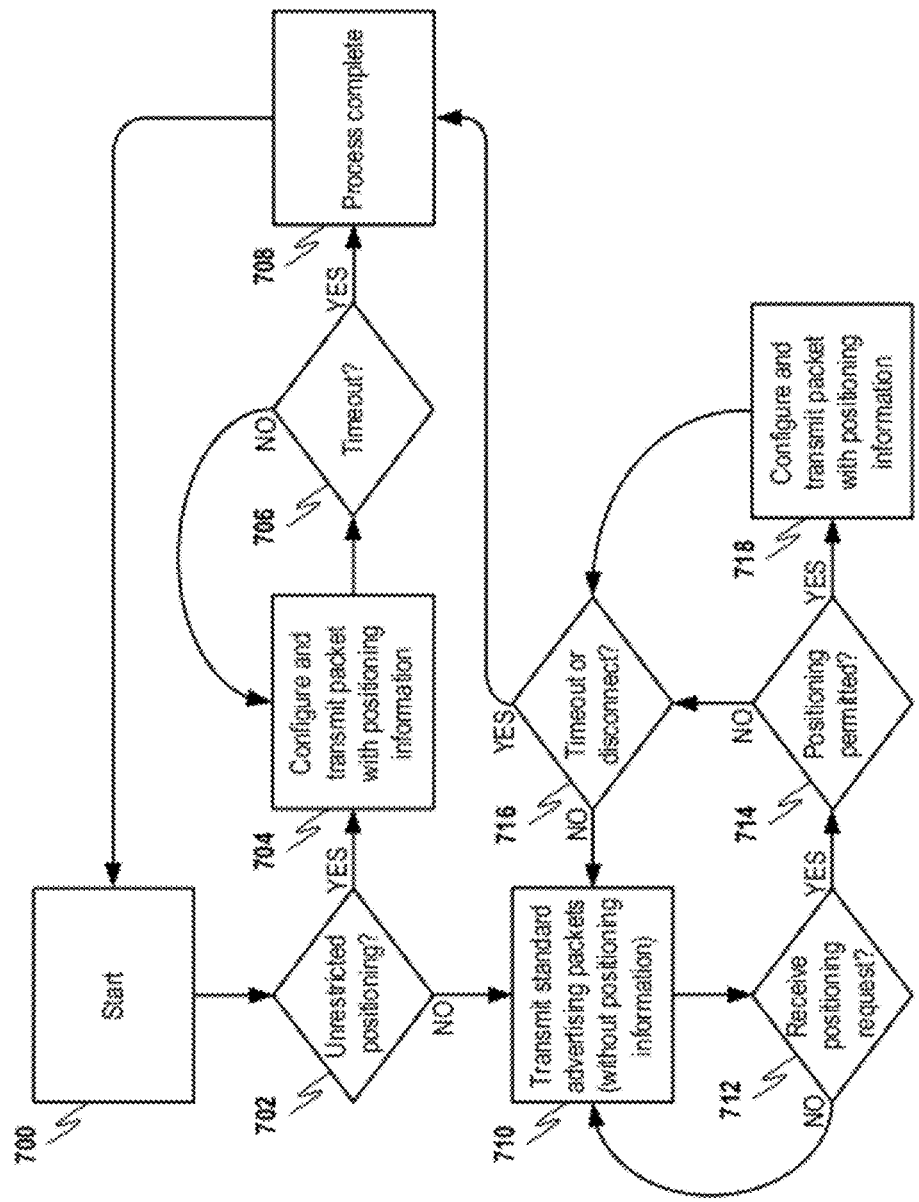

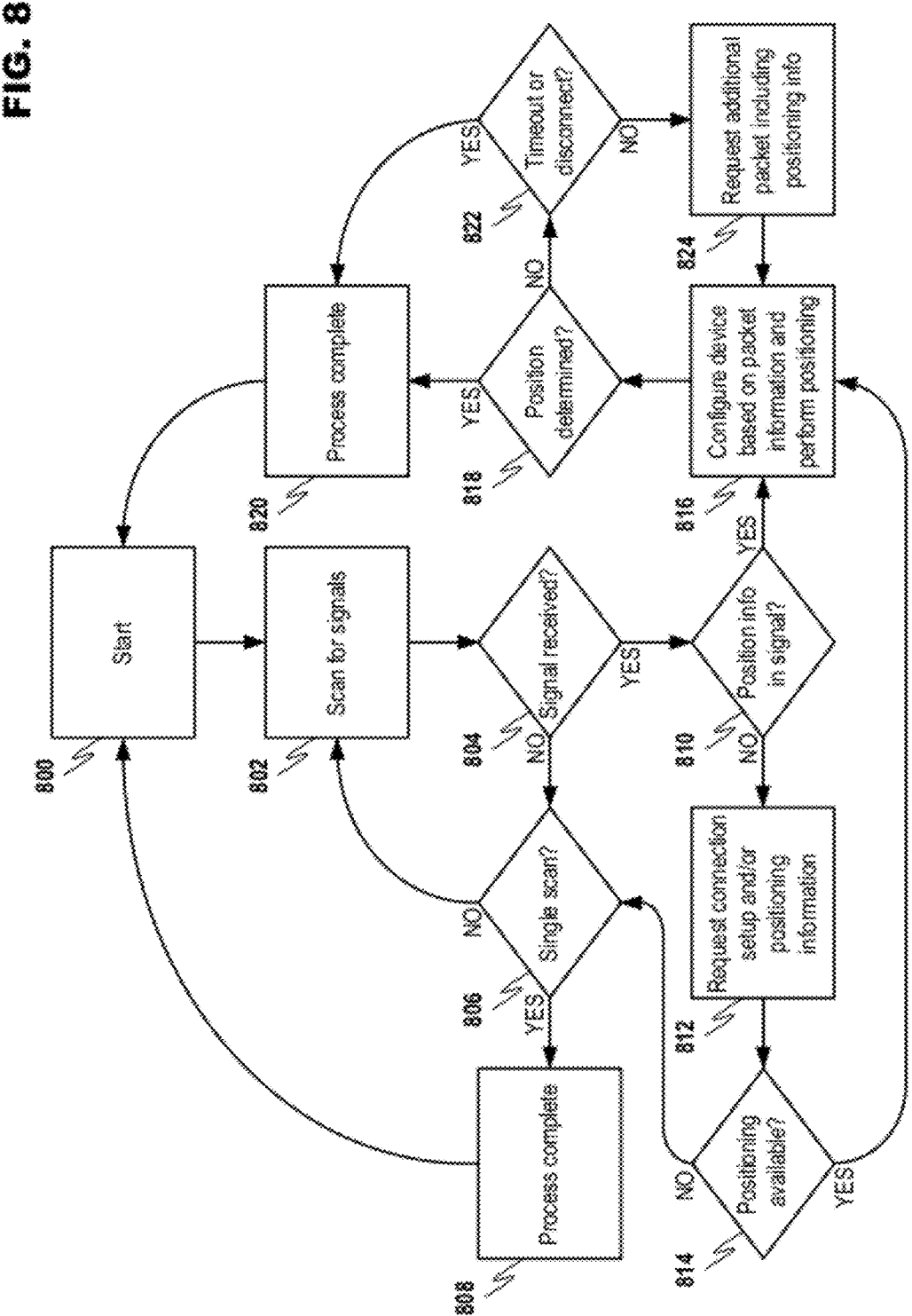

ADDITIONAL DATA USABLE IN APPARATUS POSITIONING

BACKGROUND

1. Field of Invention

The present invention relates to wireless communication, and in particular, to the provision of information usable for performing positioning operations in communication signals.

2. Background

The desire for apparatuses to serve in a multitude of roles is driving designers to incorporate more and more functionality into emerging devices. Wireless-enabled apparatuses are not only limited to the traditional conveyance of audio information, such as during telephonic operations, but may also convey video and other types of information for supporting a multitude of applications. For example, various applications may provide functionality on the surface that relies upon underlying wireless interaction for support. Obvious examples of such applications include programs that allow users to communicate directly with other users or resources, such as email, messaging services, Internet browsers, etc. There are also categories of applications that may provide services not directly related to user communication with other users or resources, but that still rely on underlying wireless exchange of information. Positioning-related services encompass a growing segment of applications that provide location services to users, such as mapping, route determination, tracking, etc., that rely upon wireless interaction for execution.

Positioning-related services may include known user-related applications, such as visual representations of locations or routes that may be displayed for users while underlying wireless communication is used to determine current apparatus position, direction, orientation, etc. However, other uses such as user/object tracking, location-specific social networking and commercial messaging, enhanced visual recognition, etc. are now becoming available that makes the ability to determine apparatus position a desirable feature to provide in mobile apparatuses. Positioning may be implemented using a variety of available technologies. For example, devices may incorporate global positioning system (GPS) receivers to receive signals from satellites for formulating an absolute (fixed) coordinate position. Terrestrial technologies (e.g., earth based cellular signals or short-range wireless interaction), while not as exact, may also be relied upon to resolve an absolute or relative (e.g., with respect to a signal source) apparatus position.

While incorporating positioning technologies in a variety of apparatuses may be possible, the implementation may not always be practical. Positioning operations may create a strain on apparatus resources as the rate at which position information needs to be updated may vary depending on the resolution needed, the rate of position change, etc. Apparatuses that have ample processing and energy resources may still rely upon controls that limit processing and energy consumption. It is therefore foreseeable that the implementation of positioning services in apparatuses that may have more limited resources will present a challenge to designers. For example, desired applications such as user/object tracking may utilize mobile battery-powered apparatuses as beacons, sensors, etc. These devices may have extremely limited processing and communication ability, may not possess adequate size for dedicate positioning hardware and/or software, may not have the power capacity to support dedicated positioning operations, etc.

SUMMARY

Various example embodiments of the present invention may be directed to a method, apparatus, computer program product, data structure and system for providing positioning information within a wireless communication signal. For example, an apparatus may determine whether to provide information usable for positioning in a packet. If it is determined that positioning information will be provided in the packet, header information in the packet may be configured to indicate that the packet includes positioning information. The positioning information may then be included in the packet, which may then be transmitted. In instances where the packet is an advertising packet, the packet may be transmitted on a predetermined advertising channel. A scanning apparatus may then receive the packet and may determine, based on the header information in the packet, whether the packet includes positioning information. If it is determined that the packet includes positioning information, positioning in the scanning apparatus may be configured based on the header information, and positioning may be performed in the scanning apparatus based on the positioning information in the packet.

In at least one example implementation, the header information in the packet may be configured to indicate a type of positioning information included in the packet, such as angle-of-departure information, angle-of-arrival information or a combination of angle-of departure and angle-of-arrival information. Regardless of the indicated type, the positioning information may be added to the packet (e.g., after the checksum), and may comprise a bit sequence usable for performing positioning in other apparatuses. Further information that may be configured in the header may comprise the length of the bit sequence and/or the structure of the bit sequence.

The header information contained in the packet may be interpreted by a receiving apparatus. If the header information indicates that no positioning information is contained in the packet, the receiving apparatus may further determine if positioning is supported by the source of the beacon. In such instances the receiving apparatus may request positioning information from the source of the beacon. If positioning information is determined to be contained in the beacon packet, at least a length for a bit sequence appended to the packet may be determined based on the header information in the received packet.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 2A discloses an example of angle-of-arrival (AoA) positioning in accordance with at least one embodiments of the present invention.

FIG. 2B discloses an example of angle-of-departure (AoD) positioning in accordance with at least one embodiments of the present invention.

FIG. 4A discloses a first example of a modified advertising packet in accordance with at least one embodiment of the present invention.

FIG. 5A discloses an example of AoD positioning information and the processing of positioning information in accordance with at least one embodiment of the present invention.

FIG. 6 discloses an example application of direction finding being used for indoor navigation in accordance with at least one embodiment of the present invention.

FIG. 7 discloses a flowchart of an example communication process from the perspective of a beacon packet transmitter in accordance with at least one embodiment of the present invention.

FIG. 8 discloses a flowchart of an example communication process from the perspective of a beacon packet receiver in accordance with at least one embodiment of the present invention.

DESCRIPTION OF EXAMPLE EMBODIMENTS

Figure 1B:
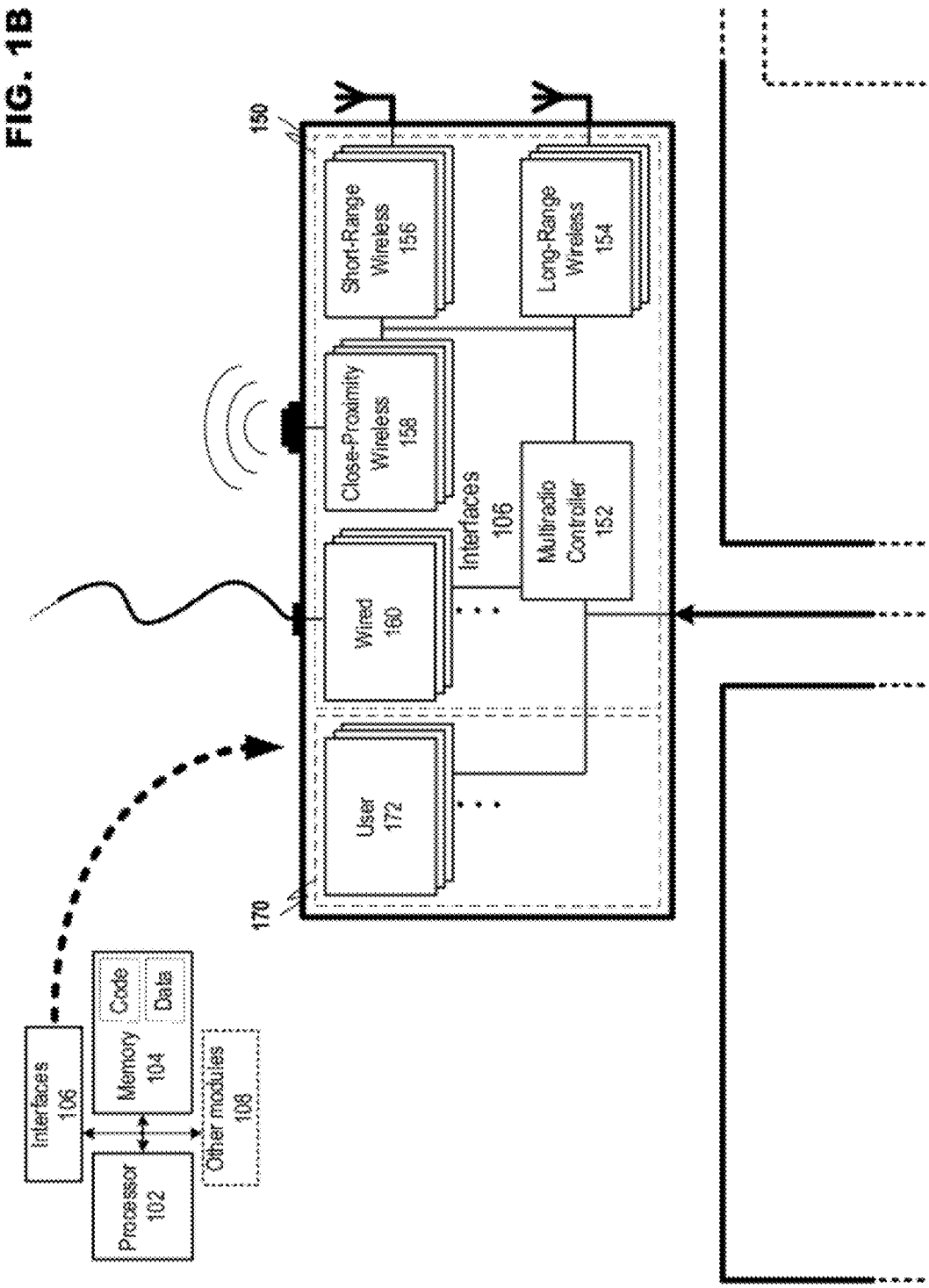
FIG. 1A discloses example apparatuses, systems, configurations, etc. that may be utilized when implementing the various embodiments of the present invention FIG. 1B discloses further detail regarding an example apparatus configuration that may be utilized when implementing the various embodiments of the present invention.

While the invention has been described below in terms of a multitude of example embodiments, various changes can be made therein without departing from the spirit and scope of the invention, as described in the appended claims.

I. Example System with Which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or embedded memories that operate in a static or dynamic mode. Further, memory 104 may include read only memories (ROM), random access memories (RAM), and rewritable memories such as Flash, EPROM, etc. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Examples of Apparatus Positioning

Positioning in apparatuses may be supported, in whole or in part, through the use of combinations of hardware interfaces and/or software applications such as previously described with respect to FIG. 1A-1B. For example, Global Positioning System (GPS) receivers may be incorporated in apparatuses and may be integrated with the aforementioned apparatus resources for receiving signals that may be used to derive coordinates corresponding to apparatus location. However, the integration of a GPS receiver may not provide an ideal solution for all situations. Implementing a dedicated GPS receiver in an apparatus may require space in the apparatus for a receiver chipset along with processing/energy resources for operating the receiver. Space is a luxury that may not exist in smaller apparatuses that are also resource limited. Moreover, GPS signals may not be reliable, or even available in some situations (e.g., if an apparatus is inside a structure like a building). As a result, other modes of positioning may need to be implemented.

FIGS. 2A and 2B disclose two examples of electronic direction-finding that may be implemented in an apparatus. For the sake of explanation in these figures it is assumed that one or both of apparatuses 200 and 202 are somewhat "simple" in that the apparatuses may possess limited space, processing and/or power resources, and thus, may communicate using a low power consumption/capacity wireless communication medium like Bluetooth Low Energy (Bluetooth LE). Bluetooth LE incorporates many of the same aspects as standard Bluetooth but comprises a lightweight Link Layer capable of providing ultra-low power idle mode operation, simple device discovery, and reliable point-to-multipoint data transfer with advanced power-save and secure encrypted connections at the lowest possible cost. While various embodiments of the present invention will be described using Bluetooth LE, the use of this communication medium is not intended to limit the present invention. On the contrary, it is conceivable that the various embodiments of the present invention may be implemented using alternative wireless mediums.

FIG. 2A discloses an example scenario where apparatus 200 may estimate the angle of arrival (AoA) of a communication signal received from apparatus 202. In the course of this estimation, various amplitude and phase samples for the signal may be measured at each antenna in an antenna array residing in apparatus 200. Amplitude and phase measurements may be recorded by cycling an RF switch through each antenna in the array. Receiving apparatus 200 may then estimate an AoA for the signal using the recorded samples and parameters related to the antenna array. The antenna array parameters may pertain the composition, configuration and placement of antennas within the antenna array, and may be set in the device, for example, as part of the apparatus manufacturing process. As further set forth in FIG. 2A, apparatus 200 must be able to identify that a signal is usable for performing AoA estimation prior to initiating the process. The usability of a signal may depend on apparatus 200 knowing what signal content to measure, including at least the length of the signal content to measure and possibility even a bit pattern contained in the signal content. The ability to communicate this signal information, given the capacity limitations of Bluetooth LE as it currently exists, may be somewhat limited.

FIG. 2B discloses an example of apparatus 200 performing angle-of-departure (AoD) estimation for a signal transmitted from apparatus 204. In such a configuration apparatus 202 may transmit AoD "enhanced" packets and may execute antenna switching during the transmission of the packet. Apparatus 200 may scan for the AoD enhanced packets and may execute amplitude and phase sampling during reception of these packets. Apparatus 200 may then utilize the amplitude and phase samples, along with antenna array parameter information, to estimate the AoD of the packet from apparatus 204. In accordance with at least one embodiment of the present invention, some of the fixed parameters related to the physical configuration of the antenna array in apparatus 204 may be obtained from a remote resource, such via a wireless link to the Internet. Again, while the positioning solution provided in FIG. 2B allows for directional estimation in an apparatus that may not contain its own dedicated position hardware and/or software, apparatus 200 must be aware that the packets in the signal transmitted by apparatus 204 are AoD enhanced packets prior to initiating the AoD estimation. Bluetooth LE, in its current form, does not provide an efficient vehicle for conveying this information to apparatus 200.

In order to communicate that information usable for direction finding is being transmitted, the advertising and/or data packets that are being used for direction finding must contain information that can be configured to indicate this purpose. However, if fields within the existing Bluetooth LE packet structure (e.g., the service field of Bluetooth LE advertising packet) are used for direction finding, the packet may be interpreted as erroneous by the cyclic redundancy checker (CRC) at the receiver. This may be due in part to delay introduced by the antenna switching process that can confuse normal packet reception. Moreover "data whitening" (e.g., scrambling both the header and the payload of packet before transmission with a data whitening word in order to randomize, and thus distinguish, the data from highly redundant patterns and to minimize DC bias in the packet) that is employed in Bluetooth LE may further hinder the use of predetermined bit sequences for positioning since the bit sequences would be scrambled by the whitening algorithm and rendered unrecognizable. Previously it was proposed that the CRC failure problem may be avoided by not performing CRC when using a packet for positioning, as data decoding and error correction are not required for a signal being used for direction finding. Taking this approach, however, may lead to several other problems related to general data reception and correction. For example, as the address of the transmitting apparatus would not be checked with CRC, the possibly exists that unreliable data will be transmitted.

III. Packets Modified to Include Positioning Information

In accordance with at least one embodiment of the present invention, positioning information may be introduced into the standard packet structure of a communication system. For example, a direction finding related field may be added into standard packet structures where CRC checking or time tracking is not enforced. In some instances a section not subject to CRC and time checking can be added as an extension into the end of a packet, such as after the CRC bits of standard Bluetooth LE packet, without affecting the standard communication itself. By appending positioning information (also referred to as tail bits below) at the end of packets, any receiving device may still process the packets as they were normal advertising or data packets. However, if a receiver is capable and instructed by its host layer, it may use the same packets to perform positioning (e.g., direction finding) processing after normal data reception procedures. This approach simplifies the implementation of direction finding receivers and may enable the transmission of data within the same packet. The various embodiments of the present invention also enable two apparatuses to simultaneously facilitate positioning with each other in either a connected state (e.g., paired) or an unconnected state (e.g., public broadcast).

Figure 3:
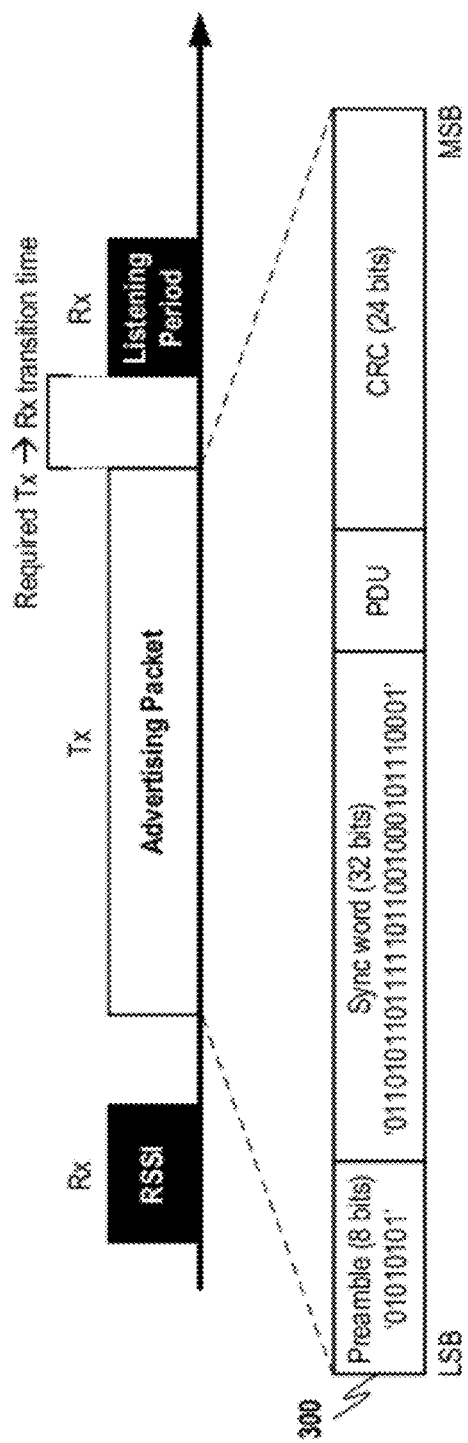
FIG. 3 discloses an example of an advertising packet in accordance with at least one embodiment of the present invention.

In FIG. 3 example Bluetooth LE advertising packet 300 is disclosed. While an advertising packet has been utilized for the sake of explanation in FIG. 3, simple data packets transmitted between two or more apparatuses that are already connected by a wireless link may also be modified to include positioning information in accordance with the various embodiments of the present invention. The least significant bit (LSB) and most significant bit (MSB) are also identified for packet 300. Packet 300 may comprise an 8-bit preamble followed by a sync word that is 32 bits. A protocol data unit (PDU) may follow the sync word, and finally a 24-bit CRC may complete packet 300. In common use, received signal strength indicator (RSSI) sensing may initially be performed by a device that seeks to transmit on a channel (e.g., an advertising channel) to ensure that the channel is available. If after RSSI sensing the apparatus deems that the channel is available, the apparatus may then transmit advertising packet 300, which may be followed by a listening period during which the apparatus may listen for replies to advertising packet 300. Bluetooth LE currently specifies that the TX→RX switching time not exceed 150 μs. If typical transceivers have TX→RX switching time of about 1 μs, then at least 100 μs are still available for the transmission of positioning information (e.g., a sequence of tail bits added to the end of the packet) and apparatus positioning based on the positioning information.

Given the above TX→RX switching limitation, a question arises as to whether enough time is available during this period to incorporate positioning functionality without disrupting the specified performance requirements. The time required for direction estimation may be calculated using the formula: Number of antennas*(number of samples per antenna*1/sampling_frequency+antenna switching period). Thus, at the minimum the time needed for positioning four antennas would be approximately 2.3 μs given that 1 MHz bandwidth results as 500 ns and sampling a frequency of 13 MHz (e.g., currently used in Bluetooth LE). In practice a higher number of samples improves the performance, and thus, the time needed for direction estimation is about 10 μs where multiple samples per antenna are obtained, which is still much less than what is available according to the current Bluetooth LE specification.

An example of an advertising packet comprising positioning information is disclosed in FIG. 4A. Example packet 400 includes "tail bits" after the 24-bit CRC field. The tail bits may comprise a sequence of bits usable for performing positioning in apparatuses, such as either of the example direction finding processes set forth in FIGS. 2A and 2B. PDU 402 is described in further detail in FIG. 4A to comprise a 16-bit header and a payload with a length defined in accordance with the length indication. PDU 402 in packet 400 may be modified to indicate various characteristics of the positioning information that was added to the packet. In modifying the existing packet structure, at least with respect to Bluetooth LE, the various embodiments of the present invention do not propose to change already assigned fields in packet 400. Instead, space in the PDU that is currently reserved for future use (RFU) may be assigned to operate in accordance with at least one embodiment of the present invention.

Figure 4B:
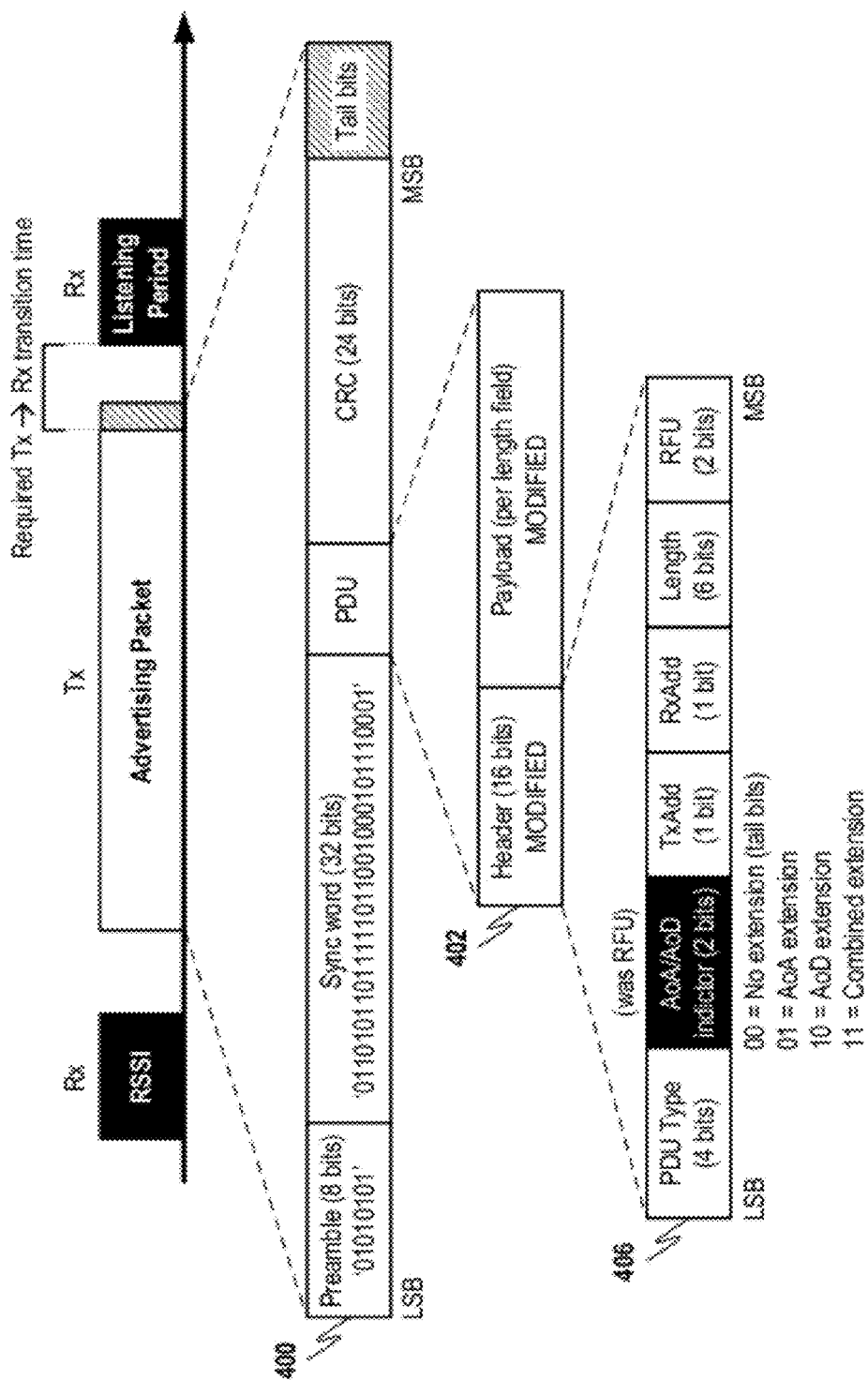
FIG. 4B discloses detail regarding the example modifications disclosed in FIG. 4A in accordance with at least one embodiment of the present invention.

For example, FIG. 4B discloses an example of RFU space that may be assigned to indicate whether extension information (e.g., tail bits) has been added to the packet. The header of PDU 402, which is described in more detail at 406, may comprise a 4-bit PDU type, two bits that were previously RFU and that are now assigned to indicate AoA/AoD information for packet 400, a 1-bit TxAdd indicator, a 1-bit RxAdd indicator, a 6-bit length indicator and two remaining bits that are RFU. The use of two bits for the AoA/AoD indicator would allow four conditions to be indicated: 00: the presence of no extension information, 01: the presence of AoA extension information in packet 400, 10: the presence of AoD information in packet 400, and 11: the presence of a combination of AoA/AoD information in packet 400. Reserving additional bits for the indicator would allow for additional positioning information types to be indicated, and thus, the number of bits assigned to the indicator may be increased based on the number of different positioning algorithms and/or technologies being employed. An apparatus receiving a packet containing the AoA/AoD indicator described at 406 may then instantly know whether the packet contains positioning information, and the type of information included in the packet.

In accordance with at least one embodiment of the present invention, receiving apparatuses may determine whether extension information (e.g., tail bits) exist in a packet prior to the CRC check. As a result, amplitude and phase sampling and/or antenna switching may be initiated faster, without having to wait possibly several µs until after the CRC check is complete, which may reduce the overall duration of the positioning process. However, one problem that may arise from operating in this manner is if the packet ends up failing the CRC check. In the instance where a packet turns out to be invalid in view of the CRC, the receiver could (depending on configuration): 1) ignore the packet and terminate processing of the extension; or 2) accept the packet and process the extension but inform the host that CRC was failed within the packet.

Figure 4C:
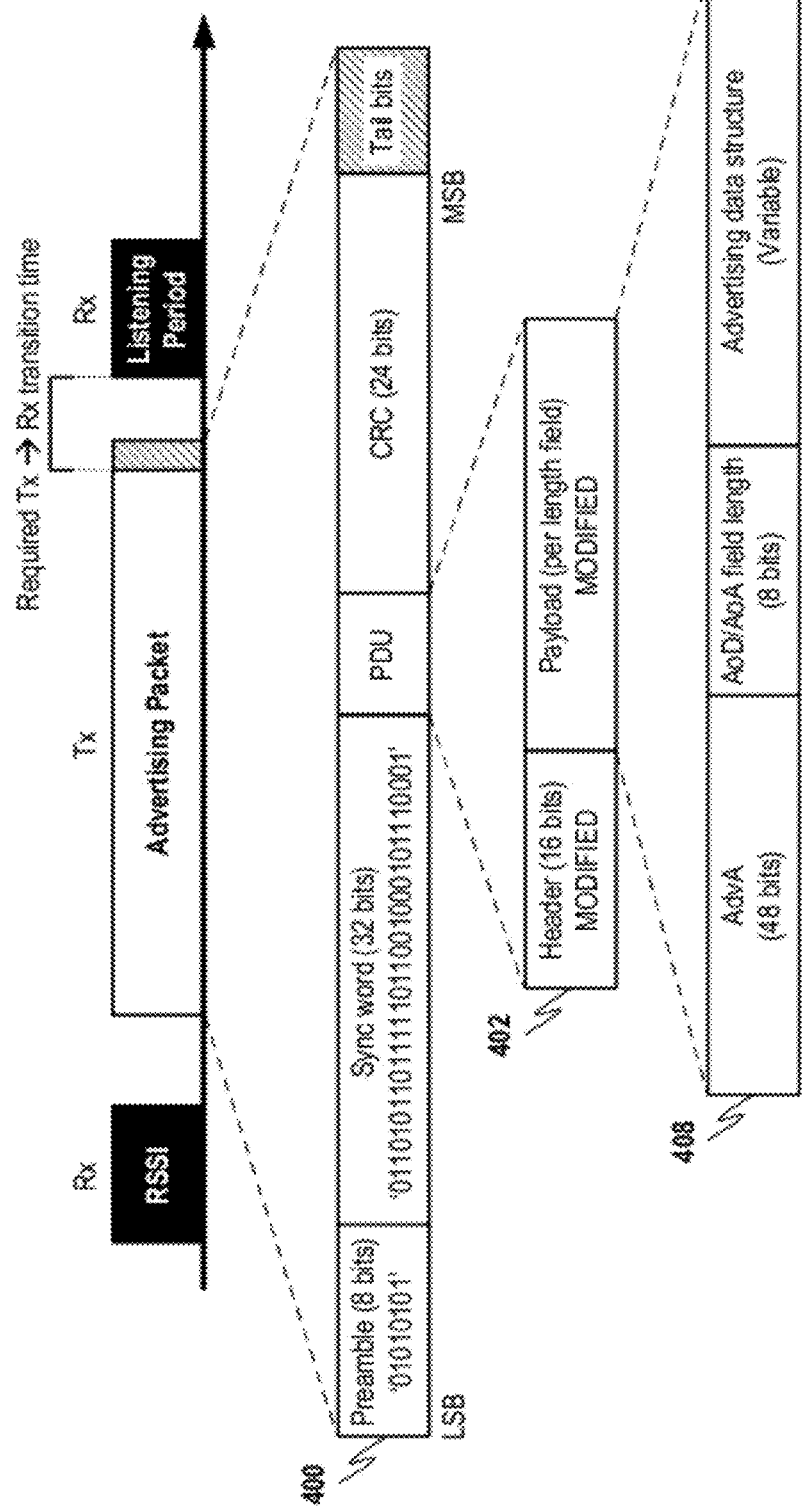
FIG. 4C discloses additional detail regarding the example modifications disclosed in FIG. 4A in accordance with at least one embodiment of the present invention.

In accordance with at least one embodiment of the present invention, FIG. 4C discloses further indicators that may be configured in PDU 402 for informing receiving devices about positioning information that may be included in packet 400. Payload 408 of PDU 402 may comprise a 48-bit AdvA field, an 8-bit AoA/AoD field length and an advertising data structure, which may be variable depending on the tail bits that have been added to packet 400. With these indicators, receiving apparatuses may not only be aware that packet 400 contains positioning information, but may also be aware of the size and composition of the positioning information. Moreover, regardless of the actual size of the positioning information included in packet 400, the total size of packet 400 will ever exceed the maximum packet size specified for Bluetooth LE.

Figure 4D:
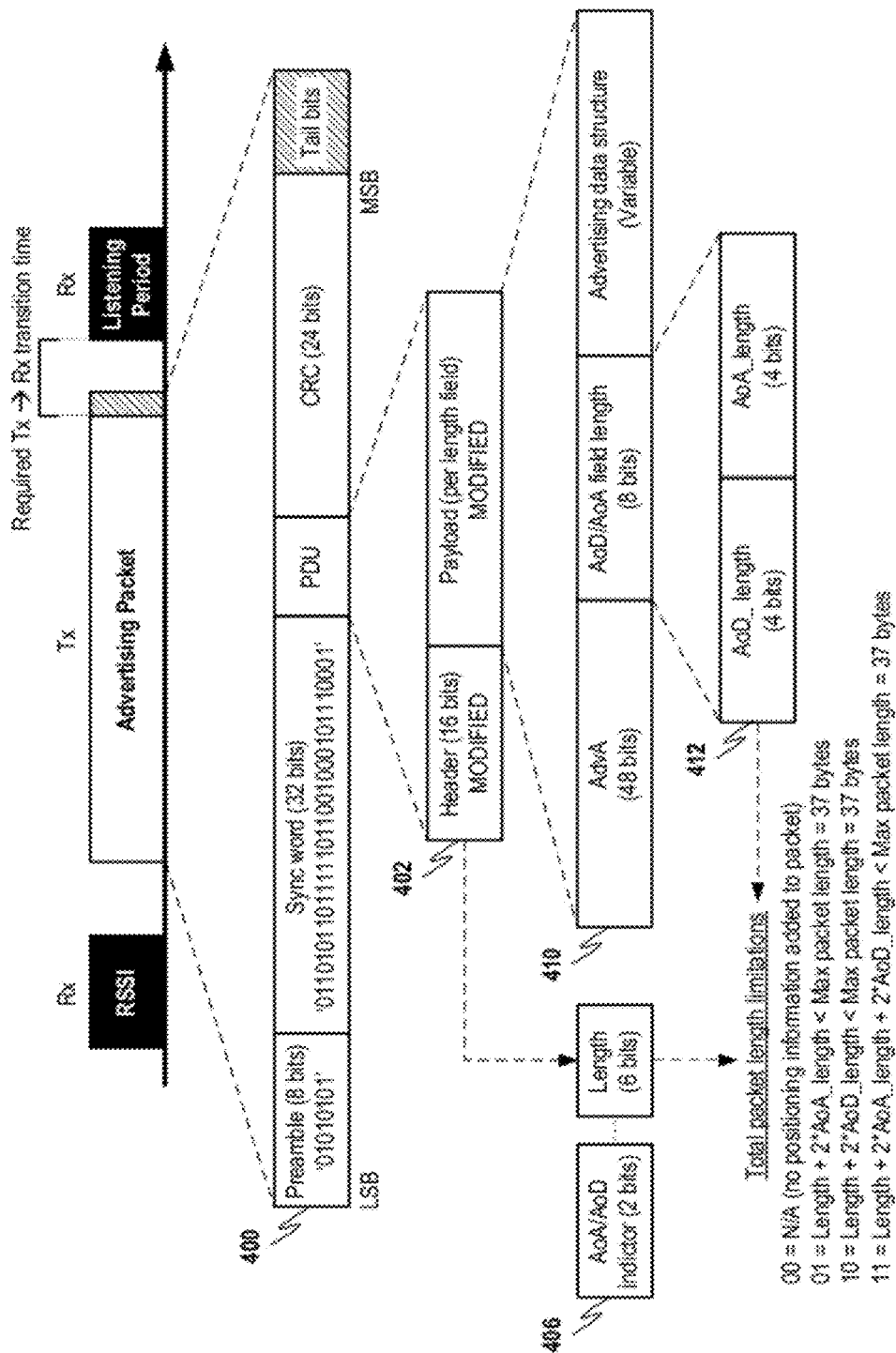
FIG. 4D discloses an alternative configuration of the example modifications disclosed in FIG. 4C in accordance with at least one embodiment of the present invention.

Limiting the total size of packets that include positioning information to below the maximum size set for a particular wireless communication medium (e.g., Bluetooth LE) may be possible in accordance with at least one embodiment of the present invention as disclosed in FIG. 4D. The AoA/AoD field length indicator introduced in FIG. 4C may be further defined as shown at 412 as two 4-bit fields: AoD_length and AoA_length. If a packet is configured to include only AoD information (e.g., the AoA/AoD indicator is set to "10"), the length of AoD information added to the packet may be limited to the length set in the PDU header (as shown at 406 in FIG. 4D)+2*AoD_length, which must be less than, or equal to, the max packet length (e.g., in the instance of Bluetooth LE the max packet length is 37 bytes). Likewise, if a packet is configured to include only AoA information (e.g., the AoA/AoD indicator is set to "01"), the size of AoA information added to the packet may be limited to the length set in the PDU header+2*AoA_length. If a packet is configured to include combined information (e.g., the AoA/AoD indicator is set to "11"), the size of AoA and AoD information added to the packet may be limited to the length set in the PDU header+2*AoA_length+2*AoD_length. Positioning information being added to packets may therefore be limited to a certain length so as not to exceed maximum size.

FIG. 5A discloses an example of the content of packet 400 when configured for use in AoD direction finding. Initially, the AoA/AoD indicator in packet 400 may be set to "10" to indicate to a receiving apparatus that AoD information has been appended to packet 400 and the AoD field length may be set to the length set in the PDU header+2*AoD_length. The positioning information added to packet 400 (e.g., after the CRC) may then comprise AoD positioning information as defined in the AoD length field as set forth at 500. The bit sequence shown at 410 may comprise a continuous wave wherein the number of bits is shown from "1" to "k" in FIG. 5A. An example of antenna switching that may occur at the transmitter (Tx) during transmission of the packet is then shown under the bit numbers, which is then followed by an example of phase and amplitude sampling that may occur at the receiver as the packet is received by the direction finder. Some or all of the information disclosed in FIG. 5A may be utilized by the receiving apparatus to estimate the angle of departure the packet took from the transmitter.

Figure 5B:
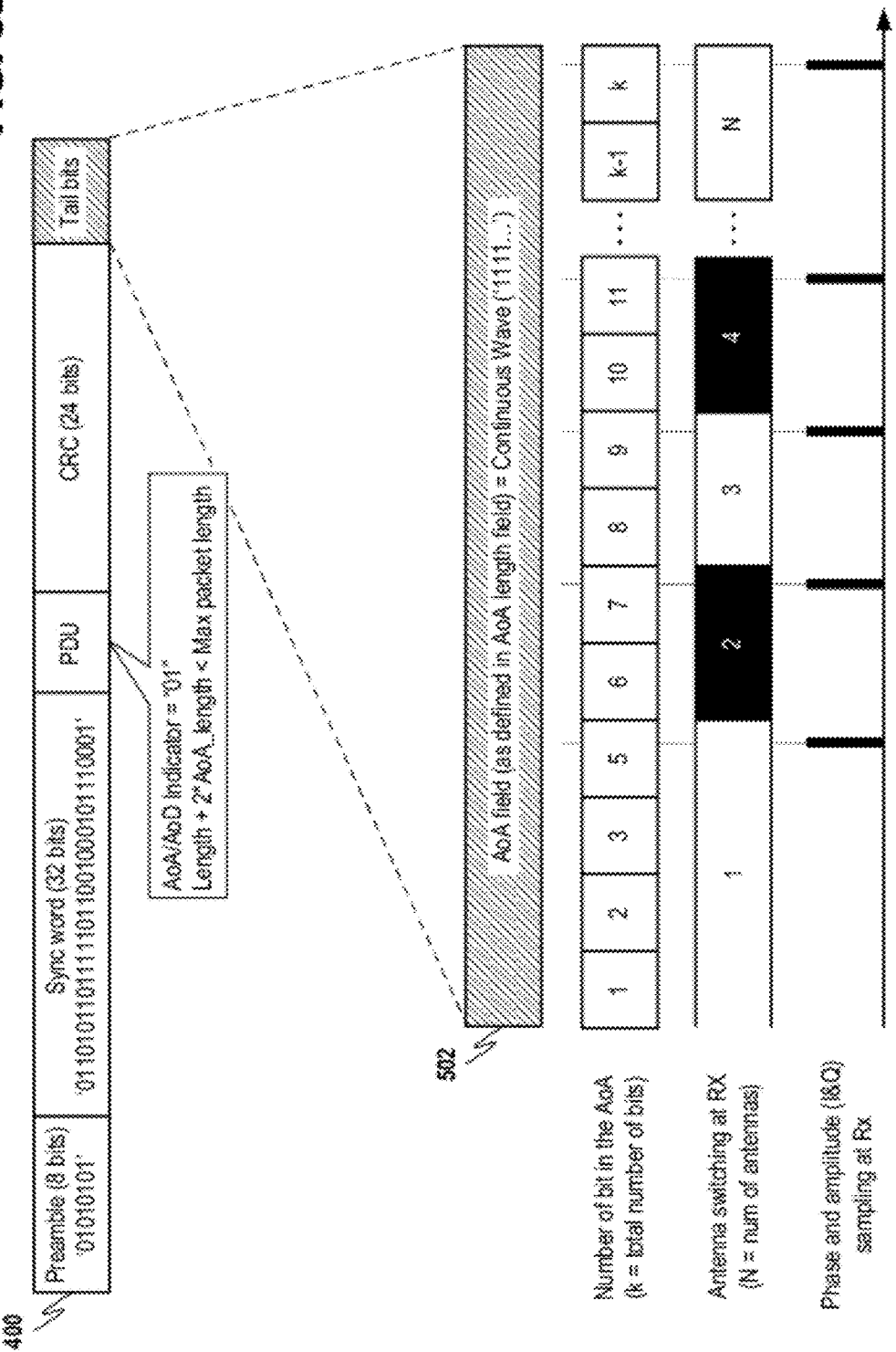
FIG. 5B discloses an example of AoA positioning information and the processing of positioning information in accordance with at least one embodiment of the present invention.

In another example, FIG. 5B discloses a scenario where packet 400 is configured for AoA direction finding. In this instance the AoA/AoD indicator is set to "01" to indicate to a receiving apparatus that the packet contains AoA positioning information and the AoA field length may be set to the length set in the PDU header+2*AoA_length. The positioning information appended to the packet may be configured as set forth at 502, wherein the length of the AoA field is defined in the AoA length field with the header of the packet PDU. Similar to the example of FIG. 5A, a continuous wave of bits may be transmitted in the packet, and may be transmitted and sensed as shown. At least one difference may be noted in the example of FIG. 5B as compared to FIG. 5A wherein the antenna switching occurs at the receiving device (Rx) instead of the transmitting apparatus since the antenna array is located in the receiver. The phase and amplitude sampling for each bit 1 to N may also occur at the receiver as shown in FIG. 5B.

Figure 5C:
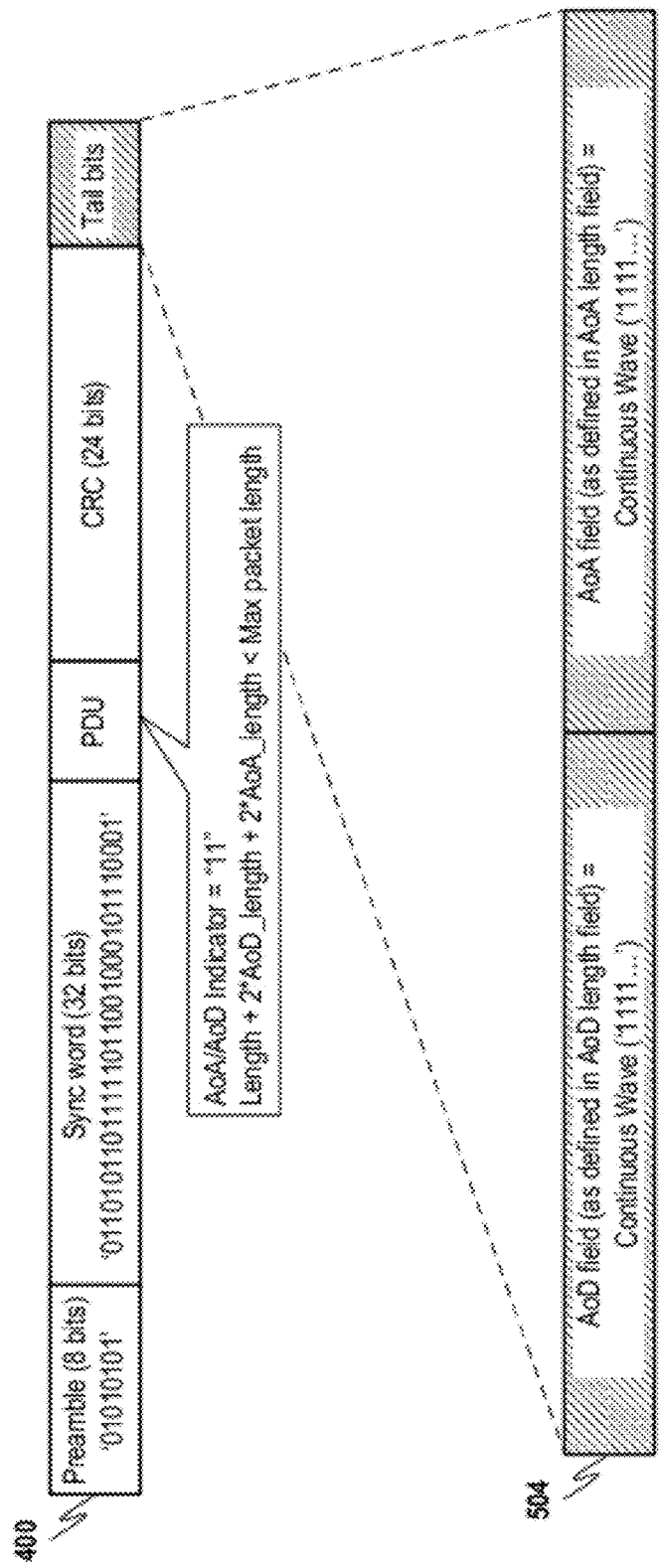
FIG. 5C discloses an example of combined positioning information in accordance with at least one embodiment of the present invention.

FIG. 5C discloses another example of packet 400 when it is configured to include positioning information for use in either AoA and AoD direction finding. In this example the AoA/AoD indicator may be configured to "11" to indicate to receiving devices that the packet contains both AoA and AoD information and the combined field length forth both the AoA and AoD information may be set to the length set in the PDU header+2*AoD_length+2*AoA_length. Example positioning information is then disclosed at 504 including both AoA and AoD information in the packet after the CRC. In this instance the packet may also contain length information that sets forth the length of both the AoA and AoD information individually so that receiving devices may know when the AoA bit sequence ends and the AoD bit sequence begins.

IV. Example Usage Scenarios

In accordance with at least one embodiment of the present invention, advertising packets or simple data packets may be modified to include positioning information usable by a receiving device for performing positioning (e.g., direction finding related to received signals). Advertising packets "advertise" the existence and availability of an apparatus prior to the establishment of a formal connection between the advertising apparatus and other apparatuses. Thus, it may be possible for advertising devices to provide positioning information to other apparatuses without ever having to formally engage other apparatuses in a network connection. One instance where such interaction may occur is where an apparatus (e.g., an access point or AP) is publicly available. In public use a "beacon" signal may append positioning information (e.g., tail bits) to each packet, and may then proceed to broadcast these packets. Beacons may then operate in non-connectable mode and may provide positioning information to other devices.

Apparatuses that broadcast beacon signals may also operate in a mode where only known devices receive positioning information. In "private" operation the beacon may add tail bits to transmitted packets only after a trusted device has requested positioning information. In both the public and private scenarios the beacons may add indicators (e.g. using service fields) to the transmitted packets that indicate that there is positioning information in the packet. The bit pattern of the tail bits may also be indicated in the packet either by sending the whole bit pattern or by using other indicator bits that define predefined bit patterns. One important characteristic for tail bit structure is that the bit sequence needs to differ from the preamble and sync patterns of standard packets to avoid the tail bits being interpreted as a beginning of a new packet.

The apparatus receiving an advertising packet that does not contain positioning information may request positioning information (e.g., tail bits) from the source of the received packet using a standard connection setup request or specific positioning request. For example, the receiving apparatus may attempt to request positioning information from the source of the received packet if the AoA/AoD indicator field is configured to "00" meaning that the packet does not contain any positioning information. The positioning request is not necessary in case of non-connectable public beacons (e.g., if the information is not already provided by the non-connectable public beacon than it is understood to not be available). Positioning may be initiated in the apparatus once packets are received that are determined to contain positioning information.

In the example of Bluetooth LE apparatuses, communication usually starts from a state where devices are advertising themselves on dedicated advertising channels by transmitting advertising packets. In the context of this example beacon devices may be smaller devices with limited resources (e.g., sensors, wrist-top computers, etc.), and thus, may not support traditional Bluetooth functionality. Such devices may be the target of more powerful direction finders. In accordance with at least one embodiment of the present invention, a beacon device may initiate operation from the idle state where no transmission is active. Periodically, or depending on the settings of the radio transceiver or commands from the host layer, the beacon device may enter an advertising state, wherein it may first make an RSSI measurement to check if the advertising channel is unoccupied. If the result of RSSI measurement indicates that the channel is free, the beacon device may transmit an advertising packet and listen for connection set-up requests from other devices. Connection set-up requests are an existing functionality of Bluetooth LE, and in accordance with at least one embodiment of the present invention, the existing listening period may be also used for the reception of positioning requests. If a positioning request is received during the response period (e.g., a direction finder device may transmit a positioning request in a connection set-up request packet or a dedicated positioning request packet), the beacon device may either enter into a network connection with the requesting device or it may stay in the advertising state. In both cases, packets including positioning information may be transmitted, provided that the transmission of the information is allowed (e.g., the beacon device is operating in a public mode, or if in a private mode the direction finder is known to the beacon device).

In accordance with at least one embodiment of the present invention, a beacon device may operate in differently depending on the application being supported. For example, a beacon device may add positioning information (e.g., tail bits) to all advertising packets prior to transmission if the beacon device always operates in a public mode. This type of operation may occur, for example, to provide positioning information for indoor navigation applications such as disclosed in FIG. 6. In this example application multiple beacon apparatuses 600 and 602 may function as non-connectable public mode transmitters that may be mounted in unobstructed and out-of-the-way places, such as on ceiling surfaces in a structure (e.g., rooms within a building). Each beacon device may possess multiple antennas, possibly configured in an array, that may be used to broadcast positioning information (e.g., AoD packets) that may be received by apparatus 200. Apparatus 200 may then perform positioning using the received packets in order to resolve a location for apparatus 200 that may be presented to a user (e.g., as a location in the building). Another implementation, in accordance with at least one embodiment of the present invention, may comprise requesting positioning information simultaneously from multiple or all available beacon devices over a wired or wireless connection other than Bluetooth LE. In such instances an apparatus may request positioning services for an area larger than the limited transmission range of wireless communication mediums like Bluetooth LE. In another scenario, if during positioning a connection is lost where a connected state is required to receive positioning information, or a pre-defined time period is exceeded in advertising state without a new request from the counterpart device being received, the beacon device may stop transmitting positioning information and may return to an idle or standard advertising state. In addition to device identification and simple positioning request functions, positioning request packets may also contain additional information like frequency hopping sequences, which may increase security and privacy between the apparatuses, a period of positioning packets that may improve accuracy of positioning and power consumption as well, and a requested bit pattern to be used for the positioning information being that will be transmitted.

Looking at the receiving end of the transaction, the operation of a direction finder may also start from the idle state. In this example the starting state may also be the advertising state of Bluetooth LE system. However, as soon as the direction finder radio module receives a command from its host/processor to start direction finding, the direction finder device may enter the scan state to commence scanning for active beacon devices. Alternatively, a direction finder device may already be aware of a beacon device and may try to set-up a connection directly. If no advertising packets are received during a pre-defined scan period, the direction finder device may exit the scan state and return to the starting state, or may repeat the scan procedure for a pre-defined time-period (depending on configuration). However, if during scanning the direction finder device receives an advertising packet from a desired beacon device (e.g., as defined by an application or configuration in the direction finder apparatus), it may enter a particular direction finding state based on, for example, whether the beacon is a public beacon or a private beacon.

Public beacons may advertise themselves periodically according to the advertising procedure described above. However, in instances where beacon devices are non-connectable it is not necessary to allow connection set-up from other devices. In accordance with at least one embodiment of the present invention, public beacons may add the positioning tail bits to all advertising packet by default. As stated above, this type of operation may be practical for indoor navigation applications. The beacon devices may transmit advertising packets that contain an information indicating the existence of configuration information in the packet. This way the direction finder device may know prior to the end of advertising packet that positioning is possible. If the non-connectable beacon does not support positioning, the direction finder device may return to scan state. However, if positioning is allowed the direction finder device may set the parameters of DF receiver based on the parameters configured in the advertising packet. Alternatively the direction finder device may transmit a request a specific tail bit pattern. After that the direction finder device may initiate positioning as long as the positioning is requested by positioning resources in the direction finder device. The positioning may be stopped based on a command from the positioning resources (e.g., after the direction finder has estimated the AoD or AoA), or after a certain period of time during which a counter in the direction finder device counts to zero. After that the direction finder device may return to idle state or advertising state.

While scanning, it may be also possible for the direction finder device to receive advertising packets from a connectable beacon device. In such instances positioning information may not necessarily be added to advertising packets by default. Therefore, the direction finder device may have to request positioning information from the beacon device so that the beacon device stays in the advertising state or the direction finder device has to establish a connection with the beacon device. In both cases the parameters of the positioning information (e.g., tail bit length and/or pattern) may be negotiated or informed through advertising packets, or via a formal connection. The positioning information request may include information defining the format of tail bit sequence, like "11111111" or "11110000," a period of consecutive advertising packets, pre-defined timer needed for positioning, etc. Based on indicators in the advertising packet the direction finder device knows if the beacon device is capable of adding the tail bits to upcoming packets. Positioning may continue with the beacon device operating in the advertising state, or may be continued over formal connection between the beacon and direction finder apparatuses if higher security is desired. Regardless of how the packets are delivered from the beacon device, the direction finder device may then start positioning. Positioning may be stopped due to a lost connection, based on commands from the direction finder device (e.g., after positioning is complete) or after a certain period of time during which a counter of direction finder device counts to zero. After that the direction finder device may return to idle state or advertising state.

In some target/direction finder applications the positioning of beacon devices may only be permitted by certain direction finder devices (e.g., the direction finder device must be "trusted" by the beacon device). For example, a beacon device may be attached to a wallet or another private item may only be targeted by the owner of these objects. In such situations the direction finder device may be forced to request packets including positioning information from the beacon device, and the beacon only adds the positioning information if it detects that the direction finder device as a trusted device.

A flowchart of an example communication process from the perspective of a transmitting apparatus, in accordance with at least one embodiment of the present invention, is disclosed in FIG. 7. The process may begin in step 700 and may proceed to step 702 where a determination may be made as to whether positioning information may be distributed from the apparatus in an unrestricted manner. For example, if the apparatus is implemented in an indoor positioning application, it may always operate in a public, non-connectable mode in order to provide positioning information to any receiving apparatus within range. On the other end of the spectrum, the apparatus may be attached to a private item (e.g., a wallet), and may only transmit positioning information when requested by a trusted (e.g., known) direction finder. If it is determined in step 702 that the apparatus may transmit positioning information in an unrestricted manner, then in step 704 packets may be configured and then transmitted including positioning information. The configuration of these packets may comprise setting indicators in the packets that may indicate to receiving apparatuses that the packets contain positioning information, the type of positioning information in the packet, the length of the positioning information in the packet and possibly the structure (e.g., bit pattern) of the positioning information. Packets may continue to be transmitted in step 704 until a timeout occurs in 706. For example, an application or configuration in the apparatus may set a time period during which the packets are transmitted from the apparatus. The process may then terminate in step 708 and may reinitiate in step 700.

If in step 702 a determination is made that transmission of positioning information is not unrestricted in the apparatus, then the process may proceed to step 710 wherein standard advertising packets (e.g., that do not include positioning information) may be transmitted. The transmission of advertising packets may continue until a positioning request is received in the apparatus in response to the standard advertising packets in step 712. A positioning request may be received in the form of a simple response requesting the establishment of a formal network connection between the transmitting apparatus and another apparatus, or in the form of a request specifically for positioning information. A further determination may then be made in step 714 as to whether the apparatus requesting positioning information is permitted to receive it. If the apparatus requesting the positioning information is determined to not be permitted to receive positioning information (e.g., the requesting apparatus is not known to, or trusted by, the transmitting apparatus) then in step 716 a further determination may be made as to whether a timeout has occurred or the devices have become disconnected. If a timeout or disconnect has occurred, then the process may terminate in step 708 and may reinitiate in step 700. Otherwise, the process may return to step 710 where standard advertising packets may again be transmitted.

If in step 714 it is determined that the requesting apparatus is permitted to receive positioning information, then in step 718 packets may be configured and transmitted to the requesting apparatus. As set forth above, the configuration of these packets may comprise setting indicators in the packets that may indicate to receiving apparatuses that the packets contain positioning information, the type of positioning information in the packet, the length of the positioning information in the packet and possibly the structure (e.g., bit pattern) of the positioning information. After the packets with the positioning information are transmitted, the process may return to step 716 where a determination may again be made as to whether a timeout has occurred or the connection between the apparatuses has been broken. The process may either then resume in step 710 with the transmission of standard advertising packets or may be complete in step 708 and reinitiate in step 700.

Another flowchart for an example process from the perspective of a receiving apparatus, in accordance with at least one embodiment of the present invention, is disclosed in FIG. 8. The process may start in step 800 and may proceed to step 802 where the apparatus may scan for signals (e.g., beacons) comprising one or more packets. In step 804 a determination may be made as to whether a signal has been received. If no signal has been received a determination may be made in step 806 as to whether the apparatus was configured for a single scan or a continuous scan. The configuration of the apparatus may be set, for example, by an application that requires apparatus position or another configuration in the apparatus. If it is determined that only a single scan has been configured then in step 808 the process may be complete and the process may then reinitiate in step 800. Otherwise, if a determination is made that more than one scan has been configured, the process may then return to step 802 in order to continue scanning for signals.

If in step 804 a determination is made that a signal comprising at least one packet has been received a further determination may be made in step 810 as to whether the received packet contain position information. The determination as to whether the packet contains position information may be made, for example, based on header information in the packet. For example, indicators may be configured in the packet header information that indicate whether the packet contains positioning information, the type of positioning information, the length of the positioning information and in some instances the structure (e.g., bit sequence) of the positioning information. If the received packet does not contain positioning information then in step 812 a request for connection setup including a request for positioning information, or alternatively a specific request for positioning information, may be transmitted to the signal source (e.g., beacon device). A determination may be then be made in step 814 as to whether positioning information is available based on any response received to the request sent in step 812, if no response is received, etc. If it is determined in step 814 that positioning information is not available, then the process may return to step 806 to determine whether further scanning should be performed.

Regardless of whether the received packet is determined to include positioning information in step 810, or alternatively, after a request for connection setup or positioning information is transmitted in step 814, the process may then proceed to step 816 wherein positioning may be initiated in the apparatus. This process may include configuring positioning in the apparatus based on information in the received packet and performing positioning. Positioning may comprise, for example, direction finding operations related to locating the source of the received packet. A determination may then be made in step 818 as to whether the desired position has been determined (e.g., whether of the direction towards the beacon apparatus has been determined). If the position has been determined, then the process may be complete in step 820 and may reinitiate in step 800. Otherwise, if in step 818 the position has not yet been determined, then in step 822 a further determination may be made as to whether a timeout has occurred or a link between the signal source and the direction finder apparatus (if necessary) has been severed. If a timeout has not occurred and the link between the devices (if necessary) is still intact, the process may proceed to step 824 where an additional packet including positioning information may be requested from the signal source. The process may then return to step 816 where positioning may again be attempted. If in step 822 a determination is made that a timeout has occurred and/or a required connection between the signal source and direction finder device has been severed, then the process may be complete in step 820 and may reinitiate in step 800.

Consideration for link layer support for AoA positioning information processing may include both receiving (Rx) and transmission (Tx) parameters. For example, on the Rx side a receiving apparatus may detect an AoA indicator from header information in a received packet, and may then activate an antenna switch trigger signal in conjunction with the beginning of the AoA positioning information. The antenna switch trigger point may be configurable based on definable clock. Amplitude and phase sampling may also be configurable during reception of the AoA information including, for example, the starting point of sampling, the sampling interval and the number of samples captured. On the Tx side, the indicator may be added to the header information in the packet, and the packet may be transmitted with a non-whitened AoA extension (e.g., after the CRC check).

Consideration for link layer support for AoD positioning information processing may include both receiving (Rx) and transmission (Tx) parameters. For example, on the Rx side a receiving apparatus may detect an AoD indicator from header information in a received packet. Amplitude and phase sampling may be configurable during reception of the AoD information including, for example, the starting point of the sampling (e.g., may be defined in the standard), the sampling interval (e.g., may be defined in the standard) and the number of samples captured. On the Tx side, the AoD indicator may be added to the header information in the packet, and the packet may be transmitted with a non-whitened AoD extension (e.g., after the CRC check). An antenna switch trigger signal may be triggered in conjunction with the beginning of transmission of AoD positioning information. The antenna switch trigger point and switching interval may be defined in the standard for the applicable wireless communication medium (e.g., Bluetooth LE).

The various embodiments of the present invention are not limited only to the examples disclosed above, and may encompass other configurations or implementations.

For example, example embodiments of the present invention may encompass apparatuses comprising means for determining in an apparatus whether information usable for positioning will be included in a packet; means for, if it is determined that the information usable for positioning will be included in the packet, configuring header information in the packet to indicate that the packet includes the information usable for positioning; means for including the information usable for positioning in the packet; and means for transmitting the packet from the apparatus via wireless communication.

In addition, example embodiments of the present invention may encompass apparatuses comprising means for scanning for wireless signals, the wireless signals comprising at least one packet; means for, if a wireless signal is scanned, determining whether header information in the at least one packet indicates that the packet includes information usable for positioning; and means for, if it is determined that the at least one packet includes information usable for positioning, configuring positioning in the apparatus based on the header information and performing positioning in the apparatus based on the positioning information.

At least one other example embodiment of the present invention may include electronic signals that cause an apparatus to determine whether information usable for positioning will be included in a packet; if it is determined that the information usable for positioning will be included in the packet, configure header information in the packet to indicate that the packet includes the information usable for positioning; include the information usable for positioning in the packet; and transmit the packet via wireless communication.

In addition, at least one other example embodiment of the present invention may include electronic signals that cause an apparatus to scan for wireless signals, the wireless signals comprising at least one packet; if a wireless signal is scanned, determine whether header information in the at least one packet indicates that the packet includes information usable for positioning; and if it is determined that the at least one packet includes information usable for positioning, configure positioning in the apparatus based on the header information and perform positioning in the apparatus based on the positioning information.

At least one other example implementation of the present invention may be directed to a data structure comprising a packet, the packet comprising at least one header; the at least one header including an indication as to whether information usable for positioning has been appended to the packet and at least one field corresponding to the length of the appended information; and information appended to the packet after the checksum, the appended information comprising at least a sequence of bits for use in positioning.

At least one other example implementation of the present invention may be directed to a system comprising a first apparatus and a second apparatus; the first apparatus determining whether information usable for positioning will be included in a packet; if it is determined that the information usable for positioning will be included in the packet, the first apparatus further configuring header information in the packet to indicate that the packet includes the information usable for positioning and including the information usable for positioning in the packet; the first apparatus further transmitting the packet via wireless communication; the second apparatus scanning for wireless signals, the wireless signals comprising at least one packet; if a wireless signal from the first apparatus is scanned, the second apparatus further determining whether header information in the at least one packet indicates that the packet includes information usable for positioning, and if it is determined that the at least one packet includes information usable for positioning, the second apparatus further configuring positioning based on the header information and performing positioning based on the positioning information.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    determining in an apparatus, whether information useable for positioning may be distributed in an unrestricted manner by the apparatus;
    determining in the apparatus, for a standard packet which does not include any information usable for positioning, whether information usable for positioning should be included in the packet, based on the determination that information useable for positioning may be distributed in an unrestricted manner by the apparatus;
    if it is determined that the information usable for positioning should be included in the packet, configuring header information in the packet to indicate that the packet includes the information usable for positioning and to indicate a type of the information usable for positioning that is included in the packet;
    including the information usable for positioning in the packet; and
    transmitting the packet from the apparatus via wireless communication.

2. The method of claim 1, wherein configuring the header information comprises setting an indicator in the header information to indicate that the packet elsewhere other than in the header includes angle-of-departure information, angle-of-arrival information, or a combination of angle-of-departure and angle-of-arrival information.

3. The method of claim 1, wherein including the information usable for positioning in the packet comprises appending a bit sequence to the end of the packet after the checksum.

4. The method of claim 3, wherein configuring the header information comprises including at least one of bit sequence length and structure information in the header information.

5. A method, comprising:
    scanning from an apparatus for wireless signals, the wireless signals comprising at least one packet which, if it is received as a standard packet, does not include any information usable for positioning;
    if a wireless signal is scanned, determining whether header information in the at least one packet indicates that the packet includes information usable for positioning; and
    if it is determined that the at least one packet includes information usable for positioning, configuring positioning in the apparatus based on the header information and performing positioning in the apparatus based on the positioning information.

6. The method of claim 5, wherein if it is determined that the wireless signal received in the apparatus does not include information usable for positioning, transmitting a response to the source of the received wireless signal requesting positioning information.

7. The method of claim 5, wherein the header information indicates that a bit sequence has been appended to the at least one packet and at least a length for the bit sequence.

8. A computer program product comprising computer executable program code recorded on a non-transitory computer readable storage medium, the computer executable program code comprising code configured to cause an apparatus to perform the method of claim 1.

9. The computer program product of claim 8, wherein code configured to cause the apparatus to configure the header information further comprises code configured to cause the apparatus to set an indicator in the header information to indicate that the packet elsewhere other than in the header includes angle-of-departure information, angle-of-arrival information, or a combination of angle-of-departure and angle-of-arrival information.

10. The computer program product of claim 8, wherein code configured to cause the apparatus to include the information usable for positioning in the packet further comprises code configured to cause the apparatus to append a bit sequence to the end of the packet after the checksum.

11. The computer program product of claim 10, wherein code configured to cause the apparatus to configuring the header information further comprises code configured to cause the apparatus to include at least one of bit sequence length and structure information in the header information.

12. A computer program product comprising computer executable program code recorded on a non-transitory computer readable storage medium, the computer executable program code comprising code configured to cause an apparatus to perform the method of claim 5.

13. The computer program product of claim 12, further comprising code configured to cause the apparatus to, if it is determined that the wireless signal received in the apparatus does not include information usable for positioning, transmit a response to the source of the received wireless signal requesting positioning information.

14. The computer program product of claim 12, wherein the header information indicates that a bit sequence has been appended to the at least one packet and at least a length for the bit sequence.

15. An apparatus, comprising:
at least one processor; and
at least one memory including executable instructions, the at least one memory and the executable instructions being configured to, in cooperation with the at least one processor, cause the apparatus to perform at least the following:
determine whether information useable for positioning may be distributed in an unrestricted manner by the apparatus;
determine, for a standard packet which does not include any information usable for positioning, whether information usable for positioning should be included in the packet, based on the determination that information useable for positioning may be distributed in an unrestricted manner by the apparatus;
if it is determined that the information usable for positioning should be included in the packet, configure header information in the packet to indicate that the packet includes the information usable for positioning and to indicate a type of the information usable for positioning that is included in the packet;
include the information usable for positioning in the packet; and
transmit the packet via wireless communication.

16. The apparatus of claim 15, wherein the at least one memory and the executable instructions being configured to, in cooperation with the at least one processor, cause the apparatus to configure the header information further comprises the at least one memory and the executable instructions being configured to, in cooperation with the at least one processor, cause the apparatus to set an indicator in the header information to indicate that the packet elsewhere other than in the header includes angle-of-departure information, angle-of-arrival information, or a combination of angle-of-departure and angle-of-arrival information.

17. The apparatus of claim 15, wherein the at least one memory and the executable instructions being configured to, in cooperation with the at least one processor, cause the apparatus to include the information usable for positioning in the packet further comprises the at least one memory and the executable instructions being configured to, in cooperation with the at least one processor, cause the apparatus to append a bit sequence to the end of the packet after the checksum.

18. The apparatus of claim 17, wherein the at least one memory and the executable instructions being configured to, in cooperation with the at least one processor, cause the apparatus to configure the header information further comprises the at least one memory and the executable instructions being configured to, in cooperation with the at least one processor, cause the apparatus to include at least one of bit sequence length and structure information in the header information.

19. An apparatus, comprising:
at least one processor; and
at least one memory including executable instructions, the at least one memory and the executable instructions being configured to, in cooperation with the at least one processor, cause the apparatus to perform at least the following:
scan for wireless signals, the wireless signals comprising at least one packet which, if it is received as a standard packet, does not include any information usable for positioning;
if a wireless signal is scanned, determine whether header information in the at least one packet indicates that the packet includes information usable for positioning; and
if it is determined that the at least one packet includes information usable for positioning, configure positioning based on the header information and performing positioning based on the positioning information.

20. The apparatus of claim 19, wherein the at least one memory and the executable instructions are configured to, in cooperation with the at least one processor, cause the apparatus to, if it is determined that the wireless signal received in the apparatus does not include information usable for positioning, transmit a response to the source of the received wireless signal requesting positioning information.

21. The apparatus of claim 19, wherein the header information indicates that a bit sequence has been appended to the at least one packet and at least a length for the bit sequence.

* * * * *